United States Patent
Kaidi

(10) Patent No.: US 11,853,411 B2
(45) Date of Patent: Dec. 26, 2023

(54) USER SPECIFIC ERROR DETECTION FOR ACCEPTING AUTHENTICATION CREDENTIAL ERRORS

(71) Applicant: PAYPAL, INC., San Jose, CA (US)

(72) Inventor: George Chen Kaidi, Singapore (SG)

(73) Assignee: PAYPAL, INC., San Jose, CA (US)

( * ) Notice: Subject to any disclaimer, the term of this patent is extended or adjusted under 35 U.S.C. 154(b) by 244 days.

(21) Appl. No.: 16/852,295

(22) Filed: Apr. 17, 2020

(65) Prior Publication Data

US 2021/0326432 A1    Oct. 21, 2021

(51) Int. Cl.
  *G06F 21/45*    (2013.01)
  *H04L 9/06*    (2006.01)
  *H04L 9/40*    (2022.01)
  *H04L 9/32*    (2006.01)

(52) U.S. Cl.
  CPC ............ *G06F 21/45* (2013.01); *H04L 9/0643* (2013.01); *H04L 9/3226* (2013.01); *H04L 63/083* (2013.01)

(58) Field of Classification Search
  CPC ....... G06F 21/45; G06F 21/31; H04L 63/083; H04L 9/3226; H04L 9/0643
  See application file for complete search history.

(56) References Cited

U.S. PATENT DOCUMENTS 10,110,578 B1 * 10/2018 Baer .................. H04W 12/068
10,819,700 B1 * 10/2020 Perlman ............... H04L 63/083
10,846,385 B1 * 11/2020 Walters ................... G06F 21/31
2006/0080544 A1 * 4/2006 Schaffer ................. G06F 21/31
  713/183

(Continued)

FOREIGN PATENT DOCUMENTS

EP       2793158 A1 * 10/2014 ............. G06F 21/31
WO    WO-2017078682 A1 * 5/2017

OTHER PUBLICATIONS

Chen, Xin; Huang, Xinyi; Mu, Yi; Wang, Ding; "A Typo-tolerant Password Authentication Scheme with Targeted Error Correction", 18th International Conference on Trust, Security and Privacy in Computing and Communications (TrustCom), IEEE, Aug. 5-8, 2019, pp. 546-553.*

(Continued)

*Primary Examiner* — Victor Lesniewski
(74) *Attorney, Agent, or Firm* — Haynes and Boone, LLP

(57) ABSTRACT

There are provided systems and methods for user specific error detection for accepting authentication credential errors. A service provider, such as an authentication server and/or transaction processor, may require credentials for a user to utilize a specific service, such as an account and account services. The user may establish an authentication credential, such as a password or other secret, that allows the user to use the account. The user may then attempt to utilize the credentials with the service provider but may perform a typo in entering the authentication credential. The service provider may reject an authentication of the user but may allow the user to reenter the authentication credential. If the user correctly enters the authentication credential at this stage, the service provider may perform analysis of the incorrect and correct authentication credential to determine whether to allow the incorrect authentication credential for future authentications.

20 Claims, 5 Drawing Sheets

(56) References Cited

U.S. PATENT DOCUMENTS

| | | | | |
|---|---|---|---|---|
| 2008/0066167 A1* | 3/2008 | Andri | ................. | G06F 21/31 |
| | | | | 726/5 |
| 2014/0165169 A1* | 6/2014 | Buck | ................. | G06F 21/46 |
| | | | | 726/19 |
| 2016/0269398 A1* | 9/2016 | Chhabra | ............. | H04L 63/0838 |
| 2020/0329025 A1* | 10/2020 | Kahn | ................ | H04L 9/3226 |
| 2021/0152537 A1* | 5/2021 | Bengani | ................ | H04L 9/3239 |
| 2021/0218724 A1* | 7/2021 | Fukuda | ................ | H04L 63/0876 |

OTHER PUBLICATIONS

Chatterjee, Rahul; Athalye, Anish; Akhawe, Devdatta; Juels, Ari; Ristenpart, Thomas; "pASSWORD tYPOS and How to Correct Them Securely", Symposium on Security and Privacy (SP), IEEE, May 22-26, 2016, pp. 799-818.*

Hendrickson, Josh. "Facebook Fudges Your Password for Your Convenience." How, How-To Geek, Jan. 25, 2019, www.howtogeek.com/facebook-fudges-your-password-for-your-convenience/. Date access Jul. 17, 2020.

* cited by examiner

USER SPECIFIC ERROR DETECTION FOR ACCEPTING AUTHENTICATION CREDENTIAL ERRORS

TECHNICAL FIELD

The present application generally relates to user authentication through passwords and other authentication credentials and more particularly to detecting and validating user specific errors during authentication credential entry to allow for typographical errors to be accepted during future authentication attempts.

BACKGROUND

Service providers may require identity verification and authentication of users prior to allowing users to utilize a service. For example, service providers may offer different services to users through accounts or other user-specific identifier, including electronic transaction processing, online interactions (e.g., social networking, microblogging, media sharing), and other types of services that may be accessed through account services of the service provider. To utilize these services and products, as well as reduce risk, the service provider may allow a user to establish account credentials, including an authentication credential, such as a password, personal identification number (PIN), or other secret.

When users attempt to authenticate themselves and/or access their account with the service provider, the users may provide the authentication credential. However, users may make typos during entry of their authentication credential and/or misremember a portion of their authentication credential. For example, common user credentials may be randomized letters and/or numbers, which may often cause entry errors. Currently, some service providers require continual reentry until the correct authentication credential is proffered, while others will lock out a user after a certain number of unsuccessful attempts. This is time consuming and causes a large amount of friction is using authentication systems. Moreover, users may be required to enter password recovery processes that take time and consume processing resources of the service provider and user's device.

Figure 1:
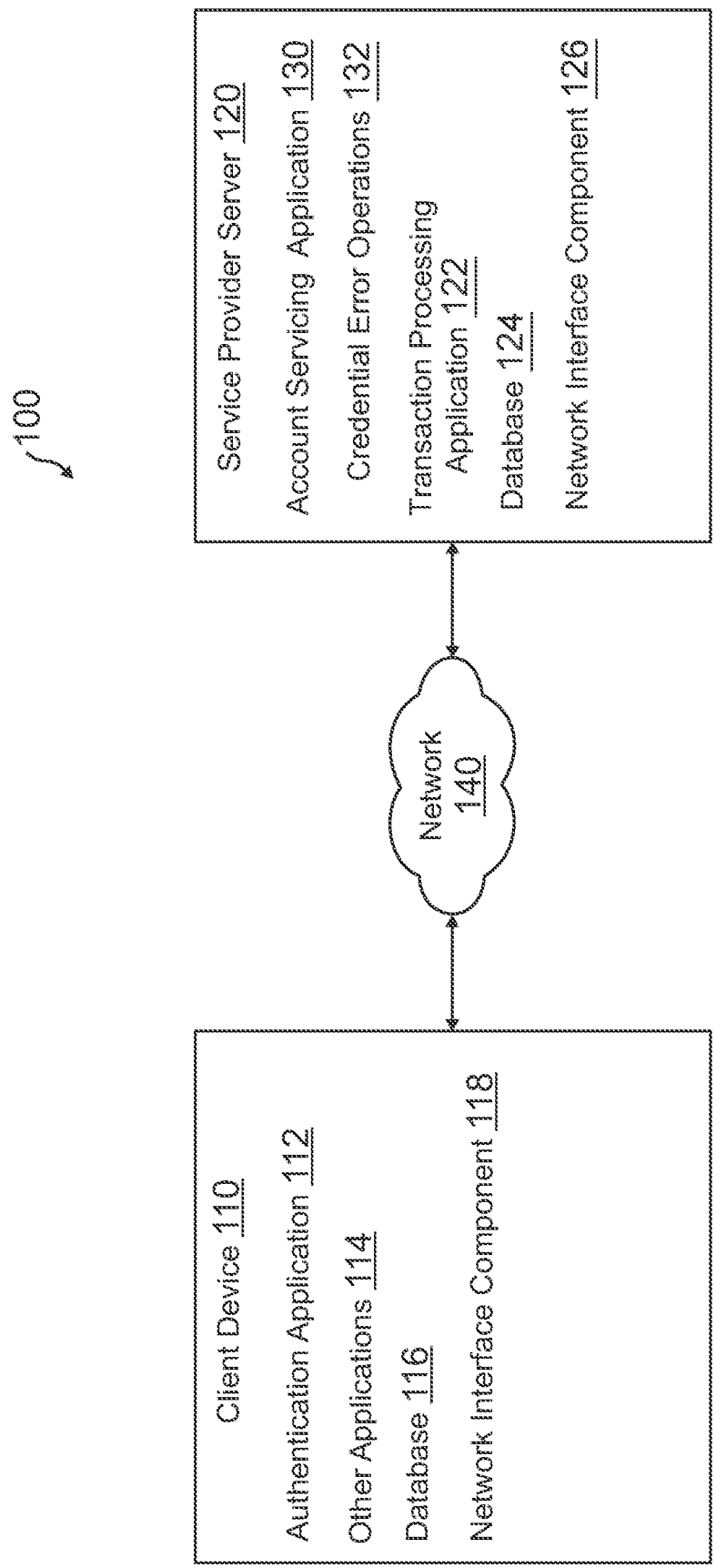
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for user specific error detection for accepting authentication credential errors. Systems suitable for practicing methods of the present disclosure are also provided.

A service provider, such as an online electronic transaction processor or other online entity requiring authentication processes, may provide error detection and processing operations to assist users with authentication when the users incorrectly enter an authentication credential. The authentication credential may correspond to a password, PIN, or other secret used by a user to authenticate themselves and/or access an account or service provided by the service provider. However, when entering the password, the user may enter an incorrect letter, number, symbol, or image such that the user is not authenticated by the service provider when submitted. The service provider may then request that the user retry the authentication attempt and reenter the authentication credential.

If the user's further authentication attempt is successful and the correct password is entered, the service provider may determine whether to store the incorrect authentication credential for the user so that the incorrect credential may later be used as an authentication credential for the account. The service provider may utilize one or more risk and/or credential storage rules for the user authentication to determine whether the incorrect credential may be stored and utilized for further authentications. These rules may be associated with a number of typographical errors (or typos) or incorrect characters (e.g., letters, numbers, symbols, images, etc.) in the incorrect credential. Further analysis of the user and/or the user's device may be used to determine whether the incorrect credential corresponds to a common typo for the user and/or device. Other checks on the device and/or user may be performed to determine if the incorrect credential is within an acceptable risk threshold to be used for further authentications. If it is, the service provider may store the incorrect credential with the authentication system and user's account or another identifier, including hashing the incorrect credential to securely store the incorrect credential that may now be used for user authentication. This incorrect credential is thus identified as a valid authentication credential along with the previous authentication credential such that the user now has two authentication credentials. Further, the service provider may alert the user of the entry of the incorrect credential and availability of the incorrect credential to be used for user authentication.

For example, a service provider may provide electronic transaction processing to entities, such as consumers and merchants that may wish to process transactions and payments. In order to establish an account and/or utilize transaction processing services, these different users may be required to establish account credentials, including a secret such as a password, PIN, or other authentication credential that allows access to the account and prevents others from access unless the authentication credential is compromised. Thus, an account with a service provider may be established by providing account details, such as a login, password (and/or other authentication credential, such as a biometric fingerprint, retinal scan, etc.), and other account creation details. The account creation details may include identification information to establish the account, such as personal information for a user, business or merchant information for another entity, or other types of identification information including a name, address, and/or other information. The entity may also be required to provide financial information, including payment card (e.g., credit/debit card) information, bank account information, gift card information, benefits/incentives, and/or financial investments, which may be used to process transactions. The online payment provider may provide digital wallet services, which may offer financial services to send, store, and receive money, process financial instruments, and/or provide transaction histories, including tokenization of digital wallet data for transaction processing. The application or website of the service provider, such as PayPal® or other online payment provider, may provide payments and the other transaction processing services.

Thus, the online service provider may store an authentication credential for the user and/or user's account. In order to securely store the authentication credential, the authentication credential may be hashed or salted using a cryptographic hashing or salting algorithm and technique. By hashing or salting the authentication credential, the credential may not be revealed in plain text to any malicious party that obtains the credential by compromising the online service provider's system. However, hashing or salting credentials causes the underlying plain text credential to be essential undiscoverable without utilizing a cryptographic process associated with the used algorithm, as brute force would take significant resources and time. Thus, precise entry of the credential is required so that matching of hashes (e.g., the stored credential hash to a received credential hash) may be performed. Errors in entry of the credential may cause a significantly different hash, and therefore authentication would not be performed even if the error in the credential is minor. In order to access an account and/or pay for a transaction (e.g., a transfer or payment to another user, merchant, or other entity), the user may also be required to login to their account with the service provider through providing their corresponding credentials, including the secret authentication credential. In this regard, the user may perform a login or an authentication attempt with the service provider. Authentication and an authentication attempt may refer to different types of user and/or account authentications that may require a secret authentication credential (e.g., password, PIN, etc.), including verifying a user, performing account authentication to access an account, and/or using the account with a service or product of the service provider.

Thus, when the user attempts authentication and enters an authentication credential, the user may perform a typo, mistake, or otherwise enter an incorrect credential. For example, the user's password may be "password," but the user may enter "pqssword." Similarly, a user may make different character mistakes in PINs and other authentication secrets. The service provider may receive the incorrect credential and determine that the credential is incorrect when comparing to the previously established and stored credential. This may be done in plain text. However, since the correct credential may be stored in a secured form through a cryptographic process, the service provider may instead first perform the hashing or salting technique on the received incorrect password. This may therefore generate a different hash than the stored hash for the correct password that was previously established. The service provider may then determine that the received password during the authentication attempt is incorrect and may request entry of a new password. Once the credential received during the authentication attempt is determined to be incorrect, the service provider may request reentry of an authentication credential. The user may reenter and, if correct, authentication may be processed, and the requested access, service, or product may be provided to the user. Additionally, the service provider may then utilize one or more risk and/or storage rules to determine whether to permit the incorrect credential to be used in future authentications for the user. When reentering the credential, the user's device may send the incorrect credential back with the correct credentials so that both credentials may be compared in plain text to determine whether the incorrect credential may be stored. In other embodiments, the service provider may cache the incorrect credential for a period of time after receipt and determination that the credential is incorrect so that when the correct credential is received, comparisons may be made.

For example, the service provider may time out the user or prevent storage of the incorrect credential if the correct credential is received too far (temporally) after the incorrect credential is entered. In some embodiments, the service provider may hash portions of both the previously established credential and the received incorrect credential from the authentication attempt. This may include hashing portions, such as 2-4 letters, a first half and a second half, or other numeric or percentage amount of the characters in the authentication credential. The service provider may then compare each corresponding portion to determine a number of errors (or error portions) within the incorrect authentication credential. For example, with the account password of "password," both "pass" and "word" may be hashed and stored with or as the account credential. When receiving the incorrect password "pqssword," "pqss" and "word" may be hashed. The service provider may then determine there is only an error in one portion of the password, thereby reducing risk that the incorrect password was provided during a brute force attack and increase likelihood that the incorrect password was a user error or typo. However, if there are errors in multiple portions, the service provider may determine that the incorrect credential received during the attempt is too risky for allowing it to be used to authenticate the user in future attempts.

The service provider may limit the number of typos to a certain number, such as one or two typos. The service provider may also perform key placement and nearby key analysis of the keyboard used for credential entry to determine character differences and variance between the incorrect credential and the correct credential. For example, when utilizing the above "password" example, "pqssword" may be acceptable as it is within a 1 key-space difference between the A and Q key (e.g., vertically) using a QWERTY keyboard. However, "ptssword" may be unacceptable as the T key is in a significantly different placement on the QWERTY keyboard. Thus, the key placement difference between characters in a horizontal and/or vertical position may be considered. This may be specific to the keyboard, touchscreen, device, or other input component used, including the keys used by the user (e.g., a line of numbers above a keyboard versus a number keypad arranged in a three by three square). Moreover, the service provider may also allow more of different variations of characters where the characters may be switched with nearby keys and/or nearby characters in the credential. For example, the service provider may allow "passowrd" as the O and W have been inverted in "password," or may allow "1324" for "1234" as the number are close and in series in the credential, which may cause inversion with users that are not careful or typing quickly. However, "1423" may be unacceptable for "1234" due to the difference in key placement and/or series in the credential.

In order to allow certain user specific errors and typos in authentication credentials, the service provider may also track repeated errors by certain users and/or certain devices. For example, a user may repeatedly enter "pqssword" for "password." The service provider may not accept "pqssword" the first time it is entered and/or store that incorrect password for use with authentication of the user and/or user's account. However, the service provider may cache "pqssword," may hash/salt "pqssword" and store in a more durable storage with the user and/or account identifier, or may otherwise record that "pqssword" was entered by the user. Thereafter, if the user continues to enter "pqssword" as a password, the service provider may determine that the user repeatedly makes this mistake. Similarly, if other users continue to make certain typos with certain devices (e.g., iOS™, Android™, mobile, tablet, etc.-based platforms), the service provider may determine these common errors and allow for storage and use of incorrect credentials when users perform these common typos. Moreover, the service provider may also determine the device of input and method of input of the credential by a user. For example, the allowance of incorrect credentials for further authentications may be restricted to mobile platforms or only when the user is detected as typing the credential through a physical or touch screen (e.g., not when the user copy and pastes a credential to a field, which should have no errors).

Further, the service provider may limit the availability of storing and allowing an incorrectly entered authentication credential to certain trusted devices and/or trusted locations. For example, a trusted device may correspond to a device that previously has been registered for the user and/or user's account or has been used in one or more previous successful authentication attempts (e.g., with the correct credential). A reputation score or risk analysis of the device may also be conducted, such as by using device parameters (e.g., hardware/software profiles, detected malware or keyloggers, device fingerprint, geo-location, etc.) to determine whether the device is trustworthy and/or affiliated with the user. Similarly, a geo-location of the device at the time of the authentication attempt may be matched to known geo-locations of the user and/or a geo-location registered for the account to determine whether the service provider may store the incorrect credential. If the device is trusted, the service provider may determine to store and use the incorrect credential. However, untrustworthy device factors may indicate a potential malicious login or higher risk, and therefore, the incorrect credential may not be stored or considered for designation as an accepted credential, and the account may be monitored.

In order to prevent oversaturation of incorrect credentials for a user and/or account, the service provider may institute certain checks prior to storing and allowing use of the incorrect credential. The service provider may check an account and/or login experience over a period of time to determine a number of failed logins. If that number exceeds a threshold, then the service provider may not store and allow use of the incorrect credential. A "completely automated public Turing test to tell computers and humans apart" (CAPTCHA) may be implemented to prevent brute force attacks that may utilize a high number of incorrect passwords. For example, an invisible CAPTCHA may be utilized to protect from automated bot attacks. Further, the service provider may limit account functionality, such as an ability to change an account password or conduct transactions over a threshold, based on use of the incorrect credential for authentication. Each incorrect credential may also be time limited and may expire after a set amount of time so that incorrect passwords may be paired from the user's account after a period of time. This allows changes in the user's typing habits, devices, and/or authentication pathways to not compromise the account by having too many stored incorrect passwords that are can be used for authentication. Thus, minor typos and errors in authentication credential entry may be allowable so that a user in not required to enter multiple credentials and/or enter a lengthy password recovery process. This streamlines data input and simplifies electronic authentication processes. Moreover, digital security may be increased over other types of credential error entry systems by specifically determining the errors for a particular user and/or device.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entity.

System 100 includes a client device 110 and a service provider server 120 in communication over a network 140. Client device 110 may be utilized by a user, merchant, business, or another entity to perform an authentication with service provider server 120, such as to access an account or perform some action (e.g., electronic transaction processing). In this regard, service provider server 120 may receive an incorrect authentication credential and request reentry of the authentication credential. Thereafter, service provider server 120 may determine whether the incorrect authentication credential, such as a password or PIN, may be stored and used for future user authentication based on risk and storage rules.

Client device 110 and service provider server 120 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 140.

Client device 110 may be implemented as a communication device that may utilize appropriate hardware and software configured for wired and/or wireless communication with service provider server 120. For example, in one embodiment, client device 110 may be implemented as a personal computer (PC), a mobile smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Client device 110 may instead correspond to a client server, such as a server or servers of a merchant or entity that is performing identity verification of consumers, other merchants, and affiliates (e.g., for use of a service or purchase of a product). Although only one device is shown, a plurality of devices may function similarly and/or be connected to provide the functionalities described herein.

Client device 110 of FIG. 1 contains an authentication application 112, other applications 114, a database 116, and a network interface component 118. In other embodiments, client device 110 may include additional or different modules having specialized hardware and/or software as required.

Authentication application 112 may correspond to one or more processes to execute software modules and associated components of client device 110 to provide authentication processes and operations associated with an authentication attempt to authenticate client device 110 and/or a user of client device 110 with service provider server 120. In this regard, authentication application 112 may correspond to specialized hardware and/or software utilized by a user of client device 110 that may be used to access an account, website, application, service, and/or product of service provider server 120, where the access may require authenticating the user through one or more credentials including a secret authentication credential. Authentication application 112 may utilize one or more UIs, such as graphical user interfaces presented using an output display device of client device 110, to provide a login interface or other authentication interface that requests entry of the authentication credentials for user. In some embodiments, the UIs may allow for entry of a username, account name, password, PIN, randomized token (e.g., an RSA token), or other authentication information.

When entering an authentication credential, the user of client device 110 may make an error, such as one or more typos that enters an incorrect letter, number, symbol, character, image, or another entry in a part or portion of the authentication credential. This may be transmitted to service provider server 120, which may return a credential error notification and a request for reentry of the credential. Thereafter, authentication application 112 may be used for one or more attempts at reentry of the credential during the authentication attempt and may send back one or more retries of the credential. The reentered credential may be transmitted together with the previously entered incorrect credential or may be transmitted alone. When authentication is processed and verified, authentication application 112 may provide the requested access and/or operation and notify the user of the successful authentication. Further, authentication application 112 may display any notifications of storage of the incorrect credential by service provider server 120.

In some embodiments, authentication application 112 may include services for electronic transaction processing provided by service provider server 120, which may be performed using an account requiring a login and/or an authentication. Authentication application 112 may be used to establish the account, which may be done by providing user and/or device information, establishing an account identifier and authentication credential, and/or registering financial information for the account. Authentication application 112 may also be used to access the account and change the authentication information, such as by resetting or changing a password or other authentication credential.

During transaction processing, authentication application 112 may be utilized to select payment instrument(s) for use in providing payment for a purchase transaction, transfer, or other financial process after performing an authentication using one or more credentials (e.g., the previously established credential as well as any incorrectly entered credentials that have been stored and approved for use). As discussed herein, authentication application 112 may utilize user financial information, such as credit card data, bank account data, or other funding source data, as a payment instrument when providing payment information. Additionally, authentication application 112 may utilize a digital wallet associated with an account with a payment provider, such as service provider server 120, as the payment instrument, for example, through accessing a digital wallet or account of a user with service provider server 120 through entry of authentication credentials and/or by providing a data token that allows for processing using the account. Authentication application 112 may also be used to receive a receipt or other information based on transaction processing.

In various embodiments, client device 110 includes other applications 114 as may be desired in particular embodiments to provide features to client device 110. For example, other applications 114 may include security applications for implementing client-side security features, programmatic client applications for interfacing with appropriate application programming interfaces (APIs) over network 140, or other types of applications. Other applications 114 may also include email, texting, voice and IM applications that allow a user to send and receive emails, calls, texts, and other notifications through network 140. In various embodiments, other applications 114 may include financial applications, such as banking applications. Other applications 114 may also include other location detection applications, which may be used to determine a location for the user, such as a mapping, compass, and/or GPS application. Other applications 114 may include social networking applications, media viewing, and/or merchant applications. As such, other applications 114 may also require authentication credentials to be input for an authentication with, access to, and/or use of other application 114 (e.g., a login requiring a password).

Client device 110 may further include database 116 stored on a transitory and/or non-transitory memory of client device 110, which may store various applications and data and be utilized during execution of various modules of client device 110. Database 116 may include, for example, identifiers such as operating system registry entries, cookies associated with authentication application 112 and/or other applications 112, identifiers associated with hardware of client device 110, or other appropriate identifiers, such as identifiers used for payment/user/device authentication or identification, which may be communicated as identifying the user/client device 110 to service provider server 120. Moreover, database 116 may include information associated with uses of client device 110, such as common typos, geo-locations, incorrectly entered credentials or other data, and/or other information that may be provided to service provider server 120 during an authentication and for use in determining whether to store and/or allow user authentication with an incorrectly entered credential.

Client device 110 includes at least one network interface component 118 adapted to communicate with service provider server 120. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 120 may be maintained, for example, by an online service provider, which may provide accounts, products, and/or services to users that require authentication. In this regard, service provider server 120 includes one or more processing applications which may be configured to interact with client device 110 to provide authentication operations, which may allow use of incorrect authentication credentials if stored during a previous authentication attempt based on risk and storage rules. In one example, service provider server 120 may be provided by PAYPAL®, Inc. of San Jose, CA, USA. However, in other embodiments, service provider server 120 may be maintained by or include another type of service provider.

Service provider server 120 of FIG. 1 includes an account servicing application 130, a transaction processing application 122, a database 124, and a network interface component 126. In other embodiments, service provider server 120 may include additional or different modules having specialized hardware and/or software as required.

Account servicing application 130 may correspond to one or more processes to execute modules and associated specialized hardware of service provider server 120 to provide account services to users to establish, maintain, and/or use an account, including other services and/or products of service provider server 120 that may be utilized with the account. In this regard, account servicing application 130 may correspond to specialized hardware and/or software used by service provider server 120 to first establish an account by providing account information, which may include user information, financial information, and/or device information. Additionally, a login name, username or identifier, and/or other account identifier may be set for the account. In order to access the account, an authentication credential may be provided by client device 110, which may correspond to a password, PIN, data for a randomized token generator, or another authentication credential. The user may establish a payment account and/or digital wallet to process transactions and/or transfers between two or more users based on this information. In various embodiments, financial information may be stored to the account, such as account/card numbers and information, which may be used for processing the transactions via transaction processing application 112.

Further, account servicing application 130 may be used to authenticate a user and/or client device 110 via an authentication interface and process, wherein an authentication attempt via the interface requests the authentication credential for the account from client device 110. Client device may provide an authentication credential, where account servicing application 130 may provide an incorrect credential. Thereafter, account servicing application 130 may execute credential error operations 132 to determine whether to store the incorrect password for the account, which may be used to store and allow use of the incorrect credential so that the incorrect credential may be used in future authentications as a valid credential for account access and authentication. In order to determine whether to store and allow use of the incorrect credential, account servicing application 130 may request reentry of the correct credential. If client device 110 provides the correct credential after providing the incorrect credential, password error operations may utilize one or more risk or storage rules to determine whether the incorrect credential should be stored and used as an authentication credential.

The risk and storage rules may correspond to typo placement and/or number, including which characters have been changed and/or switched in the credential (e.g., character reversal or switching in character placements). This may be checked through hashes of different portions of the credential. A rule may also correspond to a number of past mistakes and similar or the same past mistakes and errors made by the user and/or client device 110 (e.g., recurring past errors). Moreover, rules may be associated with a device-type and/or keyboard/input mechanism for client device 110. Additional rules may be associated with trusted devices and/or device reputation, as well as detected geo-locations for the device, account, and/or user in past authentications and/or the current authentication attempt. Further, credential error operations 132 may provide a time limit or number of subsequent tries for reentry of the correct credential to authenticate the account, where expiration of this limit causes the credential not to be stored and/or allowed for user authentication. Credential error operations 132 may also use CAPTCHAs and/or number of failed logins to prevent storage and use of the incorrect credential. If the incorrect credential is determined to be stored and allowed for user authentication, the incorrect credential may be hashed and stored with the account identifier so that the incorrect credential may be used for future logins and authentications when provided by client device 110 or another device to access and/or use the account.

Transaction processing application 122 may correspond to one or more processes to execute modules and associated specialized hardware of service provider server 120 to process a transaction, which may be done through an account serviced by account servicing application 130. In this regard, transaction processing application 122 may correspond to specialized hardware and/or software used by an entity (e.g., consumer, merchant, or other user) associated with client device 110 to process a transaction once an authentication credential is provided. This may include account access via an account credential established and/or stored by account servicing application 130, including use of an established credential provided by a user for the account and an incorrect credential having one or more typos that is stored by credential error operations 132. A digital token for the account/wallet may be used to send and process payments, for example, through an interface provided by service provider server 120. In some embodiments, the financial information may also be used to provide a payment via the account. The payment account may be accessed and/or used through a browser application and/or dedicated payment application executed by client device 110 and engage in transaction processing through transaction processing application 122. Transaction processing application 122 may process the payment and may provide a transaction history to client device 110 for transaction authorization, approval, or denial.

Additionally, service provider server 120 includes database 124. Database 124 may store various identifiers associated with client device 110. Database 124 may also store account data, including payment instruments and authentication credentials, as well as transaction processing histories and data for processed transactions. Database 124 may store financial information and tokenization data. Database 124 may further store account information, including user personal information, financial information, and/or device information. Additionally, the account information may include one or more authentication credentials, which may correspond to an established (e.g., correct) credential set for the account and a stored (e.g., incorrect, having one or more typos) credential stored for the account by credential error operations 132 resulting from an authentication attempt.

In various embodiments, service provider server 120 includes at least one network interface component 126 adapted to communicate client device 110 and/or another device or server over network 140. In various embodiments, network interface component 126 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 140 may be implemented as a single network or a combination of multiple networks. For example, in various embodiments, network 140 may include the Internet or one or more intranets, landline networks, wireless networks, and/or other appropriate types of networks. Thus, network 140 may correspond to small scale communication networks, such as a private or local area network, or a larger scale network, such as a wide area network or the Internet, accessible by the various components of system 100.

Figure 2:
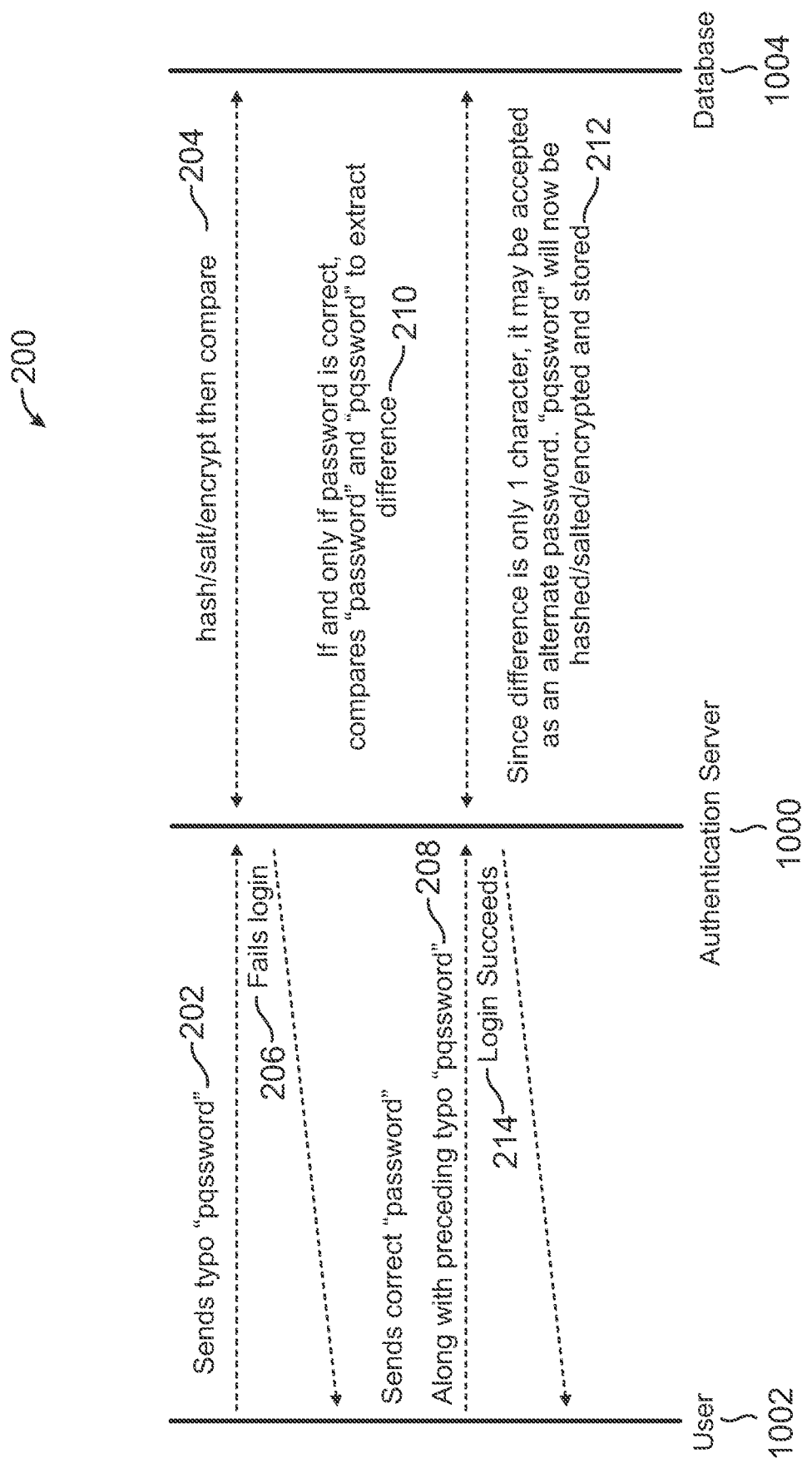
FIG. 2 is an exemplary environment where a user may interact with an authentication server of a service provider to cause typos in authentication credentials to be stored for future authentications based on risk and storage rules, according to an embodiment.

FIG. 2 is an exemplary environment 200 where a user may interact with an authentication server of a service provider to cause typos in authentication credentials to be stored for future authentications based on risk and storage rules, according to an embodiment. Environment 200 in FIG. 2 shows an exemplary interaction between an authentication server 1000, a user 1002 and a database 1004 that may be provided to verify and store an incorrect authentication credential received during an authentication attempt and process, such as in response to the user subsequently providing a correct and/or stored authentication credential after entry of the incorrect credential. In this regard, authentication server 1000 and database 1004 may correspond to the hardware and/or software provided by service provider server 120 in system 100 of FIG. 1.

In environment 200, user 1002 may initiate an authentication process and attempt to be authenticated via authentication server 1000, such as to access an account, utilize a product or service provided by an entity, verify or validate an identity, or otherwise authenticate the user and/or user's device as required by a digital platform. During the authentication attempt, user 1002 supplies an incorrect password at process 202, where the incorrect password is shown as "pqssword." This may be done to a typo by the user or by the user forgetting the correct password (e.g., "password"). Authentication server 1000 receives this incorrect password at process 202 and in order to determine whether user 1002 can be authenticated, authentication server 1000 then executes a cryptographic process to hash, salt, or otherwise encrypt the "pqssword" at process 204. When generating a cryptographic key or version of "pqssword," authentication server 1000 generates a cryptographic version that would not be the same (and may be significantly different) from a stored cryptographic version of the correct "password." Thus, at process 204, authentication server 1000 compares the stored cryptographic version of "password" stored in database 1004 to the generated cryptographic version of "pqssword" from user 1002. Authentication server 1000 determines the data stored by database 1004 is different, and therefore fails the login and authentication attempt at process 206. Further, authentication server 1000 may notify user 1002 of the failed login at process 206 and request reentry of the authentication credential.

After the failed login attempt using "pqssword," user 1002 provides "password" to authentication server 1000 at process 208, which is the correct password. At process 208, user 1002's device may also provide back the incorrect typo "pqssword" with the correct "password." Providing both the correct password and the incorrect password in a single secure transmission (e.g., through an encrypted communication channel) may allow authentication server 1000 to compare clear or plain text versions of the passwords in a single operation or processing transaction. However, in other embodiments, authentication server 1000 may instead cache "pqssword" for later storage and use if "password" is later provided and used to authenticate user 1002 during the login. This may be important in situations where user 1002 provides multiple failed logins, does not immediately attempt reauthentication and password reentry, or often enters the same typo. In this manner, authentication server 1000 may utilize the incorrect password "pqssword" for later comparison to "password" and potential storage as an additional authentication credential. Authentication server 1000 then performs a check with database 1004 if "password" is correct, for example, by generating a cryptographic version of "password" and then comparing it to the stored version of the correct password in database 1004, at process 210. Prior to comparing, authentication server 1000 may require "password" to be entered within a time period or number of subsequent authentication attempts after entry of "pqssword." If "password" is correct, authentication server 1000 then compares "password" to "pqssword" to extract a difference.

Authentication server 1000 then utilizes one or more storage rules to determine whether to store "pqssword" in database 1004 and/or allow user authentication with "pqssword." In some embodiments, authentication server 1000 may hash portions of both "pqssword" and "password" to determine a number of differences, such as a first and second half of each entered password. Authentication server 1000 may compare the first halves and the second halves to determine a number of errors (or error portions) within "pqssword." Since there would only be one error half in "pqssword," authentication server 1000 may determine "pqssword" is valid to be stored and allowed for user authentication. Authentication server 1000 may select portions of the password to individually hash based on a number of characters, a percentage of characters (e.g., a first 25% or quarter of the password, a second 25% or quarter, etc.), specific sub-words (including prefixes, suffixes, and the like) within the password, or other parameter of the password. Moreover, authentication server 1000 may determine to hash specific portions of the password based on alphanumeric rules, such as a change between a letter, number, or symbol, or a specific set of letters, numbers, or symbols.

Authentication server 1000 may also limit the number of typos within "pqssword," which is shown as only one and therefore may be acceptable for storage and use. Further, authentication server 1000 may analyze the keyboard, touchscreen, or other input mechanism utilized by user 1002 to provide "pqssword" to determine whether "pqssword" is valid to be stored and allowed for user authentication. For example, authentication server 1000 may limit typos to being a number of positions or a distance in a vertical and/or horizontal direction For example, "q" may be allowable as a typo as it is within one key space in a vertical direction on a QWERTY keyboard from "a." Authentication server 1000 may also check for inversion or switching of one or more characters, which may be common in numerical entries and/or with nearby keys within a credential. For example, with "mash", it may be common to switch "A" and "S" to enter "msah," but "amsh" would be uncommon as "M" is far apart from "A." However, in some embodiments, the switching of keys may be done when typing quickly with multiple digits, such as a keyboard, when touch screen keyboards are more unlikely to switch "M" and "A" due to the nature of character input. Thus, the operating system, device parameters and/or type, or other information may be relevant to determination of whether the incorrect password should be stored and allowed for user authentication. Moreover, if user 1002 merely copies and pastes "pqssword" into an authentication field, "pqssword" may be denied storage as user 1002 did not cause the typo through a manual entry.

Authentication server 1000 may also utilize other risk and storage rules to determine whether "pqssword" should be stored for user 1002 and allowed for user authentication. For example, authentication server 1000 may track and analyze common typos by user 1002 and only allow those typos. Thus, if the user commonly mistakes "Q" for "A," "pqssword may be stored and allowed for use authentication. Authentication server 1000 may track this between trusted devices of the user that are known to be used by the user (e.g., based on previous successful authentications and/or logins), based on a biometric received and verified of the user (e.g., a fingerprint, retinal scan, or the like), and/or based on the account or user identifier (e.g., by tracking common errors made for the same account and password). Thus, this may require that "pqssword" was entered during at least one previously failed login and/or may also be device-specific for the user, such as a difference between desktop password entry and mobile application entry. Further, authentication server 1000 may limit storage and use of incorrect passwords or other credentials to certain environments, such as specific devices or device types (e.g., mobile device/application, tablet computer, and/or desktop), device geo-locations, trusted devices, and/or devices with sufficiently high reputation scores (e.g., exceeding a threshold). Thus, if user 1002's device does not meet these criteria, authentication server 1000 may not store and allow use of "pqssword" as an alternate password for user 1002. Authentication server 1000 may also execute a CAPTCHA, including an invisible CAPTCHA, to determine that user 1002 is not a bot, and may also limit account usage and/or functionality if "pqssword is used in further authentications.

If "pqssword" is acceptable to be stored and used as an alternate password for user 1002's authentication, at process 212, "pqssword" is then hashed, salted, and/or encrypted and stored with user 1002's account and/or identifier to database 1004. Thereafter, "pqssword" is valid to be utilized as the authentication credential for user 1002. Further, authentication server 1000 then provides a successful login at process 214. Authentication server 1000 may also establish a time limit that "pqssword" is valid, such as for thirty days, so that user 1002's account does not accrue too many alternative passwords so as to minimize risk and account takeover/fraud. Further, authentication server 1000 may, in some embodiments, also notify user 1002 that "pqssword" is a valid password now for user 1002's authentication and/or account, thereby informing user 1002 of additional stored authentication credentials so that user 1002 may review, utilize, confirm, change, and/or invalidate allowable credentials for authentication.

Figure 3:
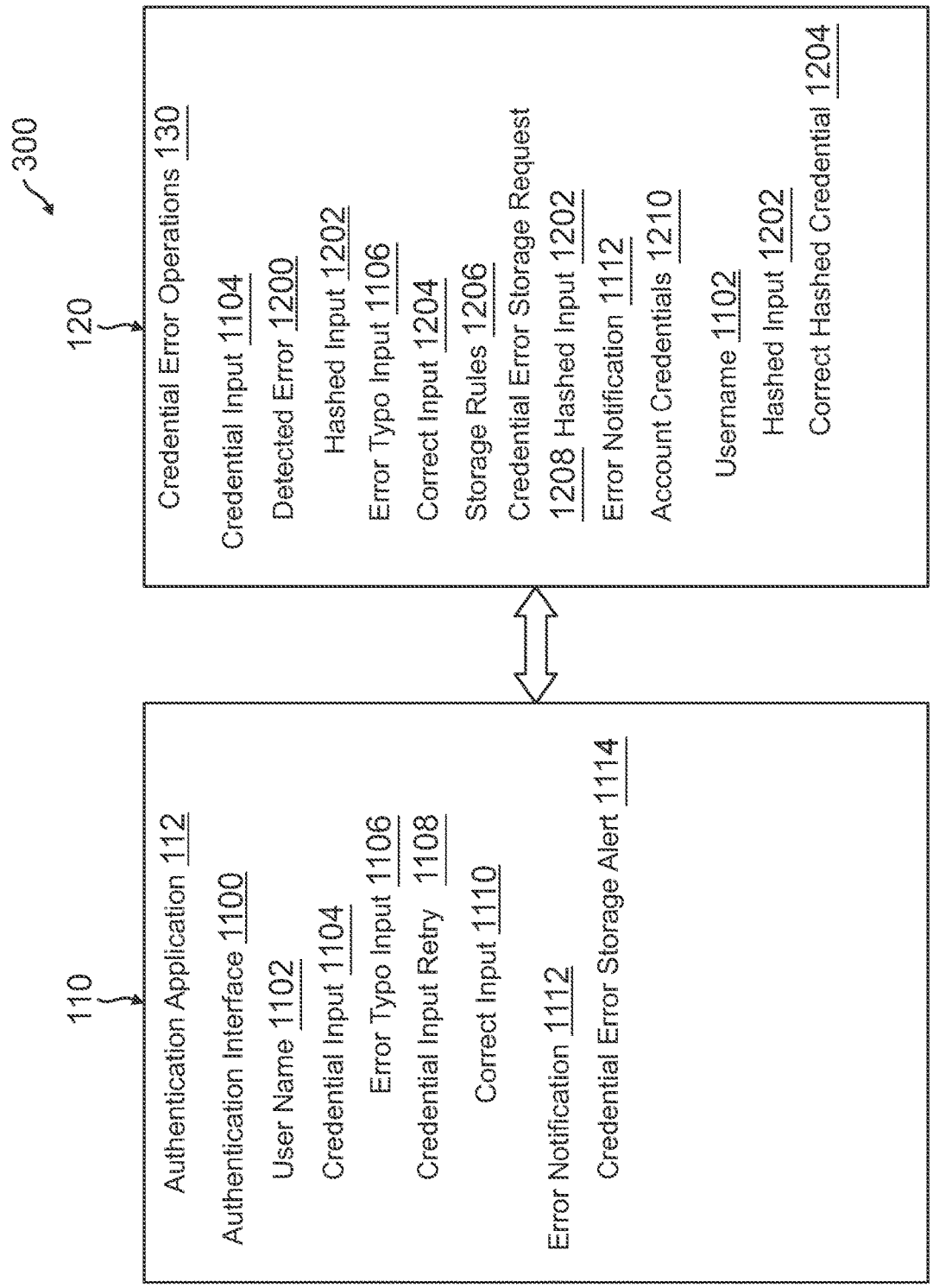
FIG. 3 is an exemplary system where a client device may provide an incorrect authentication credential during an authentication attempt, which may be stored for future authentications, according to an embodiment.

FIG. 3 is an exemplary system 300 where a client device may provide an incorrect authentication credential during an authentication attempt, which may be stored for future authentications, according to an embodiment. In this regard, system 300 shows client device 110 and service provider server 120, as discussed in reference to system 100 of FIG. 1, interacting to provide an authenticating process, where the authentication process may allow for storage and use of an incorrect authentication credential entered during the authentication process. Client device 110 executes authentication application 112 and service provider server 120 executes credential error operations 132, as discussed in system 100.

When executing authentication application 112 by client device 110, an authentication interface 1100 may be displayed to a user of client device 110, which may allow the user to attempt an authentication by entering a user or account identifier and a secret authentication credential. Thus, in authentication interface 1100, the user may enter a username 1102 (e.g., an account identifier or name) and a credential input 1104. However, when entering credential input 1104, the user may perform an error, such as an error typo input having an incorrectly supplied character in place of an intended or correct character in a correct established credential for username 1102. Error typo input 1106 in credential input 1104 may also be provided if the user does not correctly recall their credential (e.g., by not recalling a spelling of a name, a number, etc.). Thus, service provider server 120 may request a credential input retry 1108 from the user via authentication interface 1100. Thereafter, the user may provide a correct input 1110 corresponding to the established credential for username 1102. When resending correct input 1110 to service provider server 120, earlier credential input 1104 having error typo input 1106 may also be provided for analysis by service provider server 120.

Thus, service provider server 120 may execute credential error operations 132 to determine whether to store and allow use of credential input 1104 received from client device 110, which corresponds to the incorrect credential. Credential error operations 132 may determine a detected error 1200 in credential input 1104. For example, detected error 1200 may be determined based on hashed input 1202 of credential input 1104, error typo input 1106 from credential input 1104, and/or correct input 1100 that corresponds to the correct credential for user/account authentication. Thereafter, once detected error 1200 is determined, storage rules 1206 may be accessed to determine whether detected error 1200 complies with one or more risk rules to allow storage and use of credential input 1104 having the error or typo for future authentications. Storage rules 1206 may include one or more rules that allow for acceptable deviations in credential input 1104 compared to correct input 1110.

If storage rules 1206 are satisfied so that credential input 1104 can be stored and used, a credential error storage request 1208 is generated. Hashed input 1202 for credential input 1104 is determined and stored to a database of service provider server 120 so that a cryptographically secure version of the credential having the error for credential input 1104 is stored. An error notification 1112 may also be transmitted to client device 110, which may include a credential error storage alert 1114 notifying the user that credential input 1104 is stored and now usable for authentication of the user and/or account. Furthermore, service provider server 120 may update account credentials 1210 for username 1102, which includes now both the hashed input 1202 of credential input 1104 and previously established correct hashed credential 1204.

Figure 4:
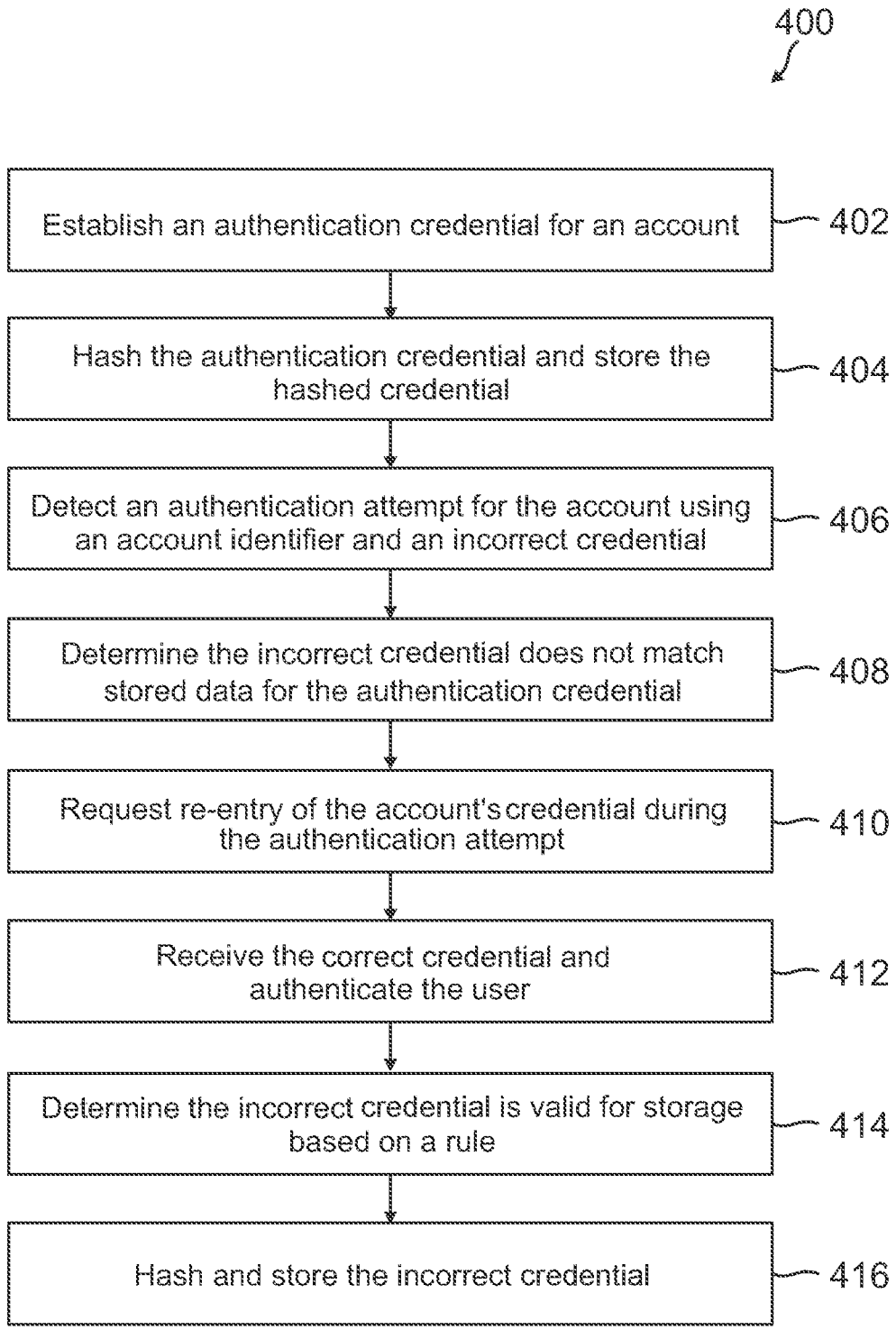
FIG. 4 is an exemplary flowchart for user specific error detection for accepting authentication credential errors, according to an embodiment.

FIG. 4 is an exemplary flowchart 400 for user specific error detection for accepting authentication credential errors, according to an embodiment. Note that one or more steps, processes, and methods described herein of flowchart 400 may be omitted, performed in a different sequence, or combined as desired or appropriate.

At step 402 of flowchart 400, an authentication credential for an account is established, such as a password, PIN, or another secret that may only allow the user(s) that know the authentication credential to access and/or use the account. The account credential may be established at an account creation and/or at a later time, such as when the user resets or changes their account password or authentication credential. Once the authentication credential is established, the service provider may hash the authentication credential and store the hashed authentication credential with the account identifier, at step 404. This then allows the authentication credential to be stored in a cryptographically secure manner so that it may not be compromised by other malicious parties. Moreover, the authentication credential may now be established for the account so that the credential may be used to access and use the account during authentication attempts.

Once established, at step 406, an authentication attempt for the account using an account identifier is detected, where the authentication attempt includes an incorrect credential for the account identifier. Thus, the service provider receiving the incorrect credential may determine that the incorrect credential does not match the stored and hashed credential previously established. This may be done by hashing the incorrect credential, which would return a different hash from the stored and hashed credential. Therefore, the service provider may determine that the incorrect credential does not match stored data for the authentication credential, at step 408. When determining that the incorrect credential does not match the stored data, the service provider may also cache or store to local temporary storage the incorrect credential, such as in plain text, so that the incorrect credential can later be analyzed with the correct credential for determination of whether to store and later accept the incorrect credential as an account authentication credential. However, the service provider may also choose not to temporarily store the incorrect credential and may later receive with the correct credential during a retry of the authentication attempt.

At step 410, re-entry of the authentication credential is requested during the authentication attempt. Re-entry may be time limited such that the user may be required to provide the authentication credential for the account within a certain amount of time and/or attempts or the incorrect credential may not be stored or allowed for user authentication. After requesting re-entry of the authentication credential, the user may attempt re-entry of the credential, and, at step 412, the authentication password is received by the user and the user is authenticated. As the correct credential has now been provided and the user authenticated, the service provider may then determine whether the incorrect password is eligible to be stored and allowed for user authentication based on one or more risk and/or storage rules. For example, the rules may govern whether certain typos in the incorrect credential are within an acceptable variance from the correct authentication profile to allow for storage and use of the incorrect credential. These rules may be based on a number of errors, degree of difference in the errors, device and/or user reputation and trust level, geo-location matching, detection that the user (not an automated bot) provided the incorrect credential, and the like. If the incorrect credential is acceptable, at step 414, the incorrect credential is determined to be valid for storage and use based on a rule. Thereafter, the incorrect credential may be further be used to authenticate access or a use of the account. In order to allow for the incorrect credential to be used, at step 416, the incorrect credential is hashed and stored. This may include generating a cryptographically secure version of the incorrect credential and storing with an account identifier or data for the account.

Figure 5:
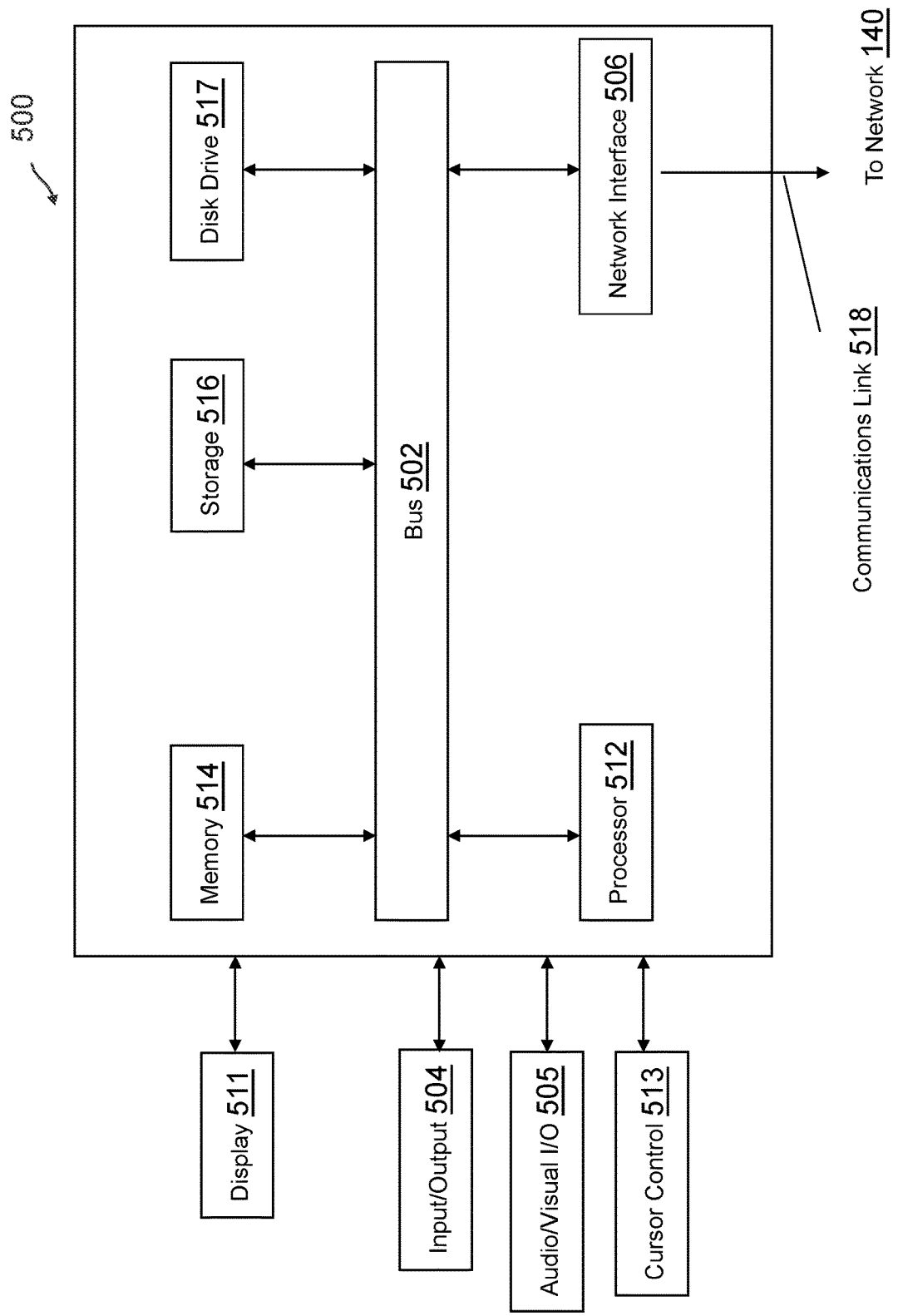
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 140. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. An authentication system comprising:
a non-transitory memory; and
one or more hardware processors coupled to the non-transitory memory and configured to read instructions from the non-transitory memory to cause the authentication system to perform operations comprising:
receiving, from a computing device, a first authentication credential during a first authentication attempt for an account of a user with the authentication system;
determining that a first credential hash of the first authentication credential does not match a stored credential hash of a stored authentication credential for the account;
receiving a second authentication credential for the account from the computing device during the first authentication attempt subsequent to the receiving the first authentication credential;
determining that a second credential hash of the second authentication credential matches the stored credential hash;
determining a device platform corresponding to the computing device used during the first authentication attempt for entry of the first authentication credential and the second authentication credential;
determining a type of one or more typographic errors made in the first authentication credential that caused the first authentication credential to not match the second authentication credential, wherein the type of the one or more typographic errors corresponds to an error in a placement of an incorrect character in the first authentication credential;
determining a storage rule for the account that limits at least a number and the type of the one or more typographic errors made to the stored authentication credential for finding the first authentication attempt to be validly performed by the user when entered using the device platform;
determining, based on the storage rule, that the first authentication attempt was validly performed for the account while having the one or more typographic errors of the stored authentication credential;
storing the first credential hash of the first authentication credential; and
allowing, during a subsequent authentication attempt, a user authentication using the first authentication credential, in addition to the second authentication credential, based on the storage rule for the account and the first credential hash, wherein the storage rule further limits the allowing the user authentication during the subsequent authentication attempt using the first credential hash to a finite number of entries or a time period the first credential hash of the first authentication credential is valid.

2. The authentication system of claim 1, wherein the first credential hash is generated by one of the authentication system when receiving the first authentication credential or the computing device when the first authentication credential comprises the first credential hash, wherein the first credential hash of the first authentication credential is generated using a hashing technique associated with the authentication system, and wherein the determining that the first authentication credential does not match the stored authentication credential utilizes the stored credential hash of the stored authentication credential from the hashing technique.

3. The authentication system of claim 1, wherein the operations further comprise:
subsequent to the storing, receiving a third authentication credential during a second authentication attempt for the account of the user;
determining whether a third credential hash of the third authentication credential matches the first credential hash or the stored credential hash; and
processing the second authentication attempt based on the third authentication credential matching the stored authentication credential or the first authentication credential.

4. The authentication system of claim 1, wherein the operations further comprise:
  subsequent to the storing, receiving a third authentication credential during a second authentication attempt for the account of the user;
  determining that a third credential hash of the third authentication credential does not match the stored credential hash or the first credential hash; and
  determining whether to store and allow user authentication using the third authentication credential at least based on the storage rule.

5. The authentication system of claim 4, wherein a plurality of storage rules for the account include the storage rule, and wherein the plurality of storage rules comprise at least one of risk rules for the authentication system, an opt-in election by the user for incorrect password storage for the account, or a maximum number of allowable incorrect passwords for storage and authentication with the account.

6. The authentication system of claim 1, wherein the storage rule further comprises one of a maximum number of allowable different characters between the first authentication credential and the stored authentication credential or a maximum allowable difference in key placement between each of the one or more typographic errors in the first authentication credential compared to the stored authentication credential, and wherein the operations further comprise:
  performing a partial hashing of the first authentication credential by hashing different portions of the first authentication credential; and
  determining a placement within the first authentication of the one or more the typographic errors,
  wherein the determining, based on the storage rule, that the first authentication attempt was validly performed comprises determining that the placement meets the storage rule.

7. The authentication system of claim 1, wherein prior to the receiving the first authentication credential during the first authentication attempt, the operations further comprise:
  receiving the first authentication credential during at least one previous authentication attempt; and
  caching the first authentication credential.

8. The authentication system of claim 7, wherein prior to the storing the first authentication credential based on the storage rule, the operations further comprise:
  determining that the first authentication credential was cached by the authentication system; and
  determining that the first authentication credential is to be stored and allowed to authenticate the account based on a number of the at least one previous authentication attempt.

9. The authentication system of claim 1, wherein prior to the receiving the second authentication credential during the first authentication attempt, the operations further comprise:
  requesting an entry of another authentication credential with a notification that the first authentication credential was incorrect for the account,
  and wherein subsequent to the storing the first authentication credential based on the storage rule, the operations further comprise:
  notifying the user that the first authentication credential has been stored and is viable to authenticate the account.

10. The authentication system of claim 1, wherein the operations further comprise:
  determining a pattern for incorrect password entry based at least on a difference between the first authentication credential and the second authentication credential; and
  allowing further incorrect authentication credentials based on the pattern and an allowable keyboard difference between input keys of the further incorrect authentication credentials.

11. The authentication system of claim 1, wherein the first authentication attempt is to perform one of accessing the account of the user via a platform provided by the authentication system, processing an electronic transaction using the account of the user, performing an account password change of the account, or accessing account data of the account.

12. A method comprising:
  receiving, by a service provider from a device, a correct password for an account of a user after receiving an incorrect password from the device during a first authentication request for the account, wherein the correct password is received within a timeframe after the incorrect password is received;
  determining a device platform corresponding to the device used during the first authentication request;
  determining an error in a placement of an incorrect character in the incorrect password;
  determining a storage rule for the account that limits input differences for typographic errors made to the correct password for finding that the incorrect password was provided during a valid authentication request for the account;
  determining that the incorrect password is authorized to be stored and used as an authentication password, in addition to the correct password, to access the account based on the storage rule, the device platform, and the error in the placement of the incorrect character for the typographic errors in the incorrect password;
  generating a cryptographic version of the incorrect password;
  storing the cryptographic version of the incorrect password associated with the account based on the determining and an authentication rule associated with the account, wherein the authentication rule limits a use of the incorrect password in a second authentication request to a finite number of entries or a time period the cryptographic version of the incorrect password is valid;
  subsequent to the storing, receiving the incorrect password during a second authentication request for the account; and
  authenticating a use of the account for the second authentication request based on the receiving the incorrect password, the cryptographic version of the incorrect password, and the authentication rule.

13. The method of claim 12, wherein the generating the cryptographic version of the incorrect password is performed using one of a salting function or a hashing function.

14. The method of claim 13, wherein the authenticating the use of the account comprises:
  comparing the generated cryptographic version during the second authentication request to the stored cryptographic version of the incorrect password from the first authentication request,
  wherein the authenticating the use is based on the comparing.

15. The method of claim 13, further comprising:
  executing a partial hashing operation that cryptographically hashes individual portions of the incorrect password and compares the cryptographically hashed individual portions to cryptographically hashed portions of the correct password; and determining that one of the individual portions of the incorrect password is different than a corresponding portion of the correct password based on the partial hashing operation.

16. The method of claim 12, wherein prior to the receiving the correct password, the method further comprises:
receiving the incorrect password;
determining a cryptographic version of the incorrect password does not match a cryptographic version of the correct password using one of a cryptographic hashing function or a cryptographic salting function; and
requesting the correct password from the device during the first authentication request.

17. The method of claim 12, wherein prior to the authenticating the use of the account, the method further comprises:
determining trust information associated with at least one of the device or the account, wherein the trust information comprises one of a device identifier, a device reputation score, an account reputation score, or a number of failed logins during the second authentication request,
and wherein the authenticating the use is further based on the trust information.

18. The method of claim 12, further comprising:
generating a fingerprint of the device of the user based on at least one of a device parameter, a network connection parameter, or a user profile; and
storing the fingerprint of the device with the incorrect password.

19. The method of claim 12, wherein the timeframe for receiving the correct password comprises one of a single authentication attempt for the first authentication request, a use session of a webpage or an interface associated with the service provider, a use session of an application on the device, or within a time limit for the first authentication request.

20. A non-transitory machine-readable medium having stored thereon machine-readable instructions executable to cause a machine to perform operations comprising:
receiving an entered authentication credential for an account with a service provider;
generating a hash value of the entered authentication credential;
accessing a plurality of authentication credentials stored for the account, wherein the plurality of authentication credentials comprise a first authentication credential for the account that was previously set for the account, wherein the plurality of authentication credentials further comprise the hash value of a second authentication credential for the account that was received during an unsuccessful account access attempt subsequent to setting the first authentication credential, and wherein the hash value of the second authentication credential was stored for the plurality of authentication credentials based on a storage rule for the account limiting typographic errors in authentication credential inputs that may be made to the first authentication credential during findings of valid authentication attempts for the authentication credential inputs;
determining that the entered authentication credential does not match the first authentication credential based on the hash value of the entered authentication credential and the hash value of the first authentication credential;
determining that the entered authentication credential matches the second authentication credential using the hash value of the entered authentication credential and the hash value of the second authentication credential;
determining a device platform used to provide the entered authentication credential for the account determining an error in a placement of an incorrect character in the entered authentication credential;
determining that the entered authentication credential is valid for a use of the account based on an authentication rule that limits the use of the hash value of the entered authentication credential to a finite number of entries or a time period the hash value of the entered authentication credential is valid, wherein the authentication rule is further associated with a permission for the error based on the device platform; and
providing the use of the account based on the determining that the entered authentication credential matches the hash value of the second authentication credential wherein both the first authentication credential and the second authentication credential are stored as valid authentication credentials to access the account.

* * * * *